United States Patent [19]
Vanoli

[11] Patent Number: 5,915,061
[45] Date of Patent: Jun. 22, 1999

[54] APPARATUS AND METHOD FOR HOUSING OPTICAL COMPONENTS

[75] Inventor: Stefano Vanoli, Verdellino, Italy

[73] Assignee: Pirelli Cavi S.p.A., Italy

[21] Appl. No.: 08/822,508

[22] Filed: Mar. 24, 1997

[30] Foreign Application Priority Data

Apr. 5, 1996 [IT] Italy ................................ MI96A0671

[51] Int. Cl.⁶ .................................................. G02B 6/36
[52] U.S. Cl. .......................................................... 385/135
[58] Field of Search .................................... 385/134, 135, 385/88, 89, 90, 91, 92, 93, 94

[56] References Cited

U.S. PATENT DOCUMENTS 5,668,911  9/1997  Debortoli ............................... 385/135
5,689,604  11/1997  Janus et al. ............................. 385/135
5,703,991  12/1997  Izumi ..................................... 385/135

FOREIGN PATENT DOCUMENTS

0595395  5/1994  European Pat. Off. .......... H01S 3/06
0595396  5/1994  European Pat. Off. .......... H01S 3/06
WO 95 35590  6/1995  WIPO .............................. H01S 3/06

*Primary Examiner*—Hung N. Ngo
*Attorney, Agent, or Firm*—Norris Mc Laughlin & Marcus; L. P. Brooks

[57] ABSTRACT

An optoelectronic apparatus comprising a casing (110) inside which an electronic unit and an optical unit electrically interconnected are disposed; the optical unit comprises an element (100) on which at least one component is housed, which can be of an optical type, of optical connection, of an electro-optical type (270, 275, 300), said element (100) comprising a plurality of separate areas (190, 195), so that each area houses components substantially of a single type.

9 Claims, 5 Drawing Sheets

APPARATUS AND METHOD FOR HOUSING OPTICAL COMPONENTS

DESCRIPTION

The present invention relates to the optoelectronic-device device packaging field.

Optoelectronic apparatuses are devices used to optically generate, scan or modify (that is without conversion to electrical signals or signals of another kind) the lightwave signals transmitted over an optical-fiber line. Belonging to this class are for instance optical amplifiers, optical pre-amplifiers, fiber lasers, optical spectrum scanners, filters and optical switches in planar optics, e.g. of lithium niobate and the like.

In particular the so-called "fiber" amplifiers are known, in which the amplifying element consists of an active optical fiber length, obtained by doping with particular substances (typically rare earth elements); over this fiber length the optical signal is amplified, using pumping light energy supplied from laser sources.

Sometimes, amplification is divided into two amplification stages, that is comprising two distinct active-optical-fiber lengths. Two-stage optical amplifiers are known from U.S. Pat. No. 5,115,338 and European Patent Application EP 0509577, for example.

Accomplishment of optoelectronic apparatuses, in particular two-stage or multi-stage optical amplifiers surely is an unsimple operation, above all due to the great number of splicings to be made between optical fibers; in addition, difficulties are increased and made still worse due to the requirement of keeping the apparatus bulkiness to a minimum.

To the purposes of the present application, by optical component it is meant a component operating on optical signals without any electrical supply or control, such as for example an active fiber, optical coupler, optical isolator.

By electro-optical component it is instead meant a component operating on an optical signal requiring an electrical supply or control, such as for example a semiconductor laser, photodiode or tunable optical filter and the like.

An active-fiber optical amplifier comprises several different electrical, electro-optical and optical components. Among the optical components there is at least one active fiber, one or more optical couplers and optionally optical isolators. Among the electro-optical components there is at least one pumping laser and optionally one or more measuring diodes. Electric components are comprised of feeding and control circuits. All components must find a placement in the amplifier casing.

The electric components are usually arranged on one or more boards, together with the electro-optical components. Arrangement of the electric circuits involves no particular problems and is made in the same manner as in any kind of electrical apparatus by means of printed circuits on the same boards or by cables joined to appropriate terminals on the boards.

On the contrary, due to the structural constraints imposed by optical fibers, arrangement of the optical components such as active fibers, isolators, couplers and the like is more delicate.

In fact, optical fibers can be bent only to a given minimum radius of curvature, otherwise attenuations in the signal or even damages to the fiber structure occur. In addition, interconnections between different fibers are carried out by appropriate apparatuses implementing an intimate connection of the two fiber ends by butt-splicing so as to minimize the signal attenuations due to connections; each splicing thus made is encapsulated in a cylindrical protection jacket, thus embodying an optical-connection component.

Finally, each optical or electro-optical component is provided with fiber lengths for connection with other components; these fiber lengths (referred to as pig-tails) have a certain length to enable resplicings in case of errors or repositionings (a component devoid of pig-tail or in which the pig-tail is too short is no longer usable) and the amplifier casing must therefore be provided with sufficient room to house these fiber lengths, usually referred to as surplus fiber. In addition, for performing the splicing operation the use of appropriate apparatuses in a position close to the amplifier casing is required, externally of same, for bulkiness reasons; for this reason too the availability of a sufficient fiber length is required for access from the amplifier to said apparatuses during the assembling step.

Arrangement of the optical components within the casing of an active-fiber optical amplifier must take all these requirements into due consideration.

Usually, housings for one or more active-fiber coils and means for partly winding the pig-tails (spools or the like) are provided; location of the remaining components depends on the arrangement of the active fiber and pig-tails. Often, the different passive components and splices are disposed in the casing in a rather disorderly manner, and assembling is therefore particularly complicated; in addition, fastening of the components may result unsafe, as it is for example achieved by means of hooks and/or a silicone-based bonding agent.

European Patents No. EP-0595395 and No. EP-0595396 disclose active-fiber optical amplifiers in which an appropriate arrangement of the components has been conceived so as to minimize the amplifier bulkiness, in order to facilitate insertion thereof into cabins or cabinets. In these amplifiers, the presence of two separate units is provided: i) one optical unit having specific housings variously disposed within the unit, for active and passive optical components, electro-optical components and splices, and ii) one electronic unit in which the electric and electronic components are housed.

However, in the above mentioned European patents optical units are described in which the component arrangement is directed towards achieving a reduction in the overall bulkiness of the amplifier, rather than making assembling and servicing of said units simpler and safer.

In the Italian Patent Application No. MI94A002531 a particular container is on the contrary described for housing components in an optical unit of an active-fiber amplifier. This container is formed of some box-shaped elements into which active optical components, passive optical components and splices are respectively inserted. In addition, the element holding the passive optical components contemplates the use of housings of previously assigned sizes for arranging them. The shape and sizes of the housings are dictated by the shape and sizes of the optical components to be inserted therein; possible differences (in terms of smaller components) can be compensated for by perforated connecting caps of elastic material to be fitted onto the component before it is inserted into the grooves.

In this case, the optical components and splices are protected by closed boxes and the surplus fibers are disposed within the optical unit of the amplifier, in the areas unoccupied by the boxes. In particular, the presence of many closed boxes holding the components, some of which also stacked upon each other, makes the access to the desired components complicated.

In addition, once the optical unit has been opened, the surplus fiber, due to its elasticity, appears to be a hindrance to assembling and servicing operations.

The present invention aims at providing an optoelectronic apparatus in which the arrangement of the components within the casing is rationalized so as to enable both a stable placement of the components and an easier accomplishment of the assembling, servicing and replacement operations of same.

Therefore, the present invention relates to an optoelectronic apparatus comprising a casing within which an electronic unit and an optical unit electrically interconnected are disposed, the optical unit comprising an element housing at least one component, said component belonging to one of the following groups: of an optical type, of optical connection, of an electro-optical type, which apparatus is characterized in that said element comprises a plurality of separate areas, each of said plurality of areas housing components substantially of a single type.

The component arrangement within the optical unit according to a predetermined criterion involves a simplification in the structure thereof and an easier accessibility to the housed components. For example, all electrical contacts of the electro-optical components are gathered on an area assigned to them, in a position facilitating connection with the electronic unit. In addition, unlike the solution described in MI94A002531, the component sets need no longer to be protected by means of closed containers since, due to the high specialization of the involved areas it is unlikely that accidental contacts with components of other types will occur. Finally, as a result of the above arrangement, procedures of visual inspection or possible repair are simplified and guaranteed by the high accessibility offered which, in addition, enables removal of possible parts to be replaced while minimizing the necessity to take away other parts, which will bring about a cost reduction.

Preferably, said organizer element comprises a first face in opposition to a second face, the area for optical-connection components being placed on said first face and the area for components of the optical type being placed on said second face, each area substantially having the same size as, and being in opposition to the other area.

This particular distribution of areas increases the advantages brought about by the specialization of the areas. Actually, components that more easily need external interventions, such as splices, are located in a more accessible area than the others; as a result, components such as the optical ones, located in other areas are still more protected because they are less exposed to involuntary damages, during the splicing operations for example.

Typically, the area for components of the electro-optical type is adjacent to said area for components of the optical type and said area for optical-connection components. In addition, said at least one component of the electro-optical type passes through said organizer element.

In a preferred embodiment of the present invention said area for optical-connection components is directly accessible from the exterior, once said electronic unit has been removed. Preferably, said area for optical-connection components comprises a receiver for collecting surplus optical-fiber lengths and an area for housing splices interconnecting optical fiber lengths. Typically, said receiver comprises means for holding said surplus fiber lengths therewithin. In addition, said area for housing splices is disposed close to the casing edges. Preferably, said organizer element is a substantially monolithic element.

In another embodiment of the present invention said area for components of the optical type comprises a first area for components of the active optical type and a second area for components of the passive optical type. Preferably, said organizer element comprises at least one housing in which at least one component of the optical type is housed, said at least one housing having a section of at least one pre-established size and an inner seating of appropriate size so as to receive said at least one optical component.

This avoids the accomplishment of a different receiver each time there are different components to be housed, in contrast to the description of MI94A002531. In fact it is sufficient to modify the inner seating of the housing to make it possible to insert components therein which have a great variety of shapes and sizes without being obliged to act on and modify the receiver or even the organizer element.

Typically, said at least one pre-established size is comprised of a plurality of multiple sizes of a common value and said at least one housing is removable. In addition, said at least one housing is disposed in said second area and said optical component comprises a passive optical component.

Preferably, in said area for components of the electro-optical type a limited number of components of the non-electro-optical type are housed.

In another aspect of the present invention, it is provided a method of assembling an optoelectronic apparatus comprising a casing having closure means, an optical unit and an electronic unit, characterized in that it comprises the following steps:

dividing said optical unit into a plurality of areas;

disposing at least one component on said optical unit; said component belonging to one of the following groups: of an optical type, of optical connection, of an electro-optical type; each of said plurality of areas housing components substantially of a single type;

inserting said optical unit into said casing, one portion of said optical unit being directly accessible from the outside;

electrically connecting said electronic unit to said optical unit;

linking said electronic unit with said optical unit;

closing said casing by closing means so as to removably engage said units in said casing.

Preferably, said portion of said optical unit comprises at least one area of said plurality of areas, said optical-connection components being disposed on said at least one area.

The present invention will be described hereinafter, by way of example, with reference to the accompanying drawings, in which.

It is to note that the component number and type as shown in the optoelectronic apparatus is not to be considered as a limitation to a specific configuration; to the ends of the invention the particular combination embodied by any number of different components appears to be quite irrelevant. Actually the same teachings can be for example utilized for making an optical amplifier, an optical pre-amplifier, a fiber laser, an optical spectrum scanner or an optical fiber in planar optics and the like.

Figure 1:
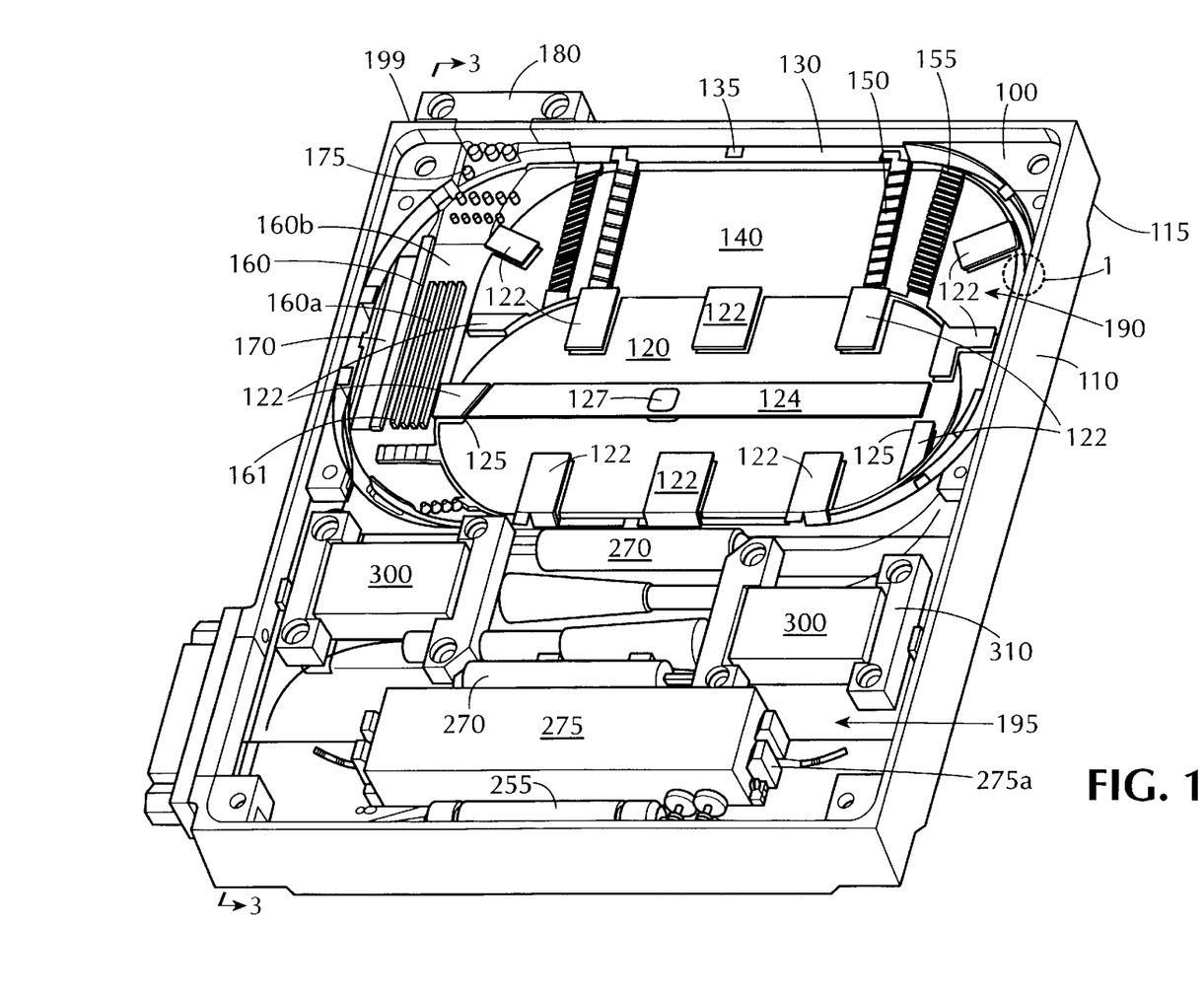
FIG. 1 shows a perspective top view of an optical unit of an optoelectronic apparatus in accordance with one embodiment of the present invention.

Shown in FIG. 1 is an optical unit comprising optical components (e.g. active-optical-fiber lengths, isolators or wavelength-selective couplers, directional couplers), optical-connection components (e.g. splicings and surplus fiber) and electro-optical components (e.g. semiconductor lasers, photodiodes and tunable optical filters) disposed on an organizer frame 100.

The optical unit is housed in a container 110 that preferably externally has a recess 115 close to the corners to enable connection with external elements, a board for example, without an increase in the container 110 height.

The frame 100 is divided into separate and dedicated different areas or surfaces, that is on which components mainly of the same type are disposed; in particular, shown in FIG. 1 is an area 190 on which the optical-connection components are gathered, that is splicings carried out on the optical-fiber lengths provided with their protection jackets and the surplus fiber, and an area 195 on which the electro-optical components are housed.

In more detail, in the area 190 there is an interface 180 constituting the access or exit element of the optoelectronic apparatus for the optical fibers, not shown in the figure and that, by engaging said fibers, avoids the axial tensile stresses from the fiber lengths disposed externally being transmitted to the inner fiber lengths. Preferably, to this end an elastic inner coating of an elastomeric material such as a silicone-based resin is adopted so that an appropriate protection against axial tensile stresses is maintained for the inner fiber lengths, while at the same time the length linked with the interface 180 is subjected to a reduced pressure, so that impairment of the optical behavior thereof is avoided.

Figure 2:
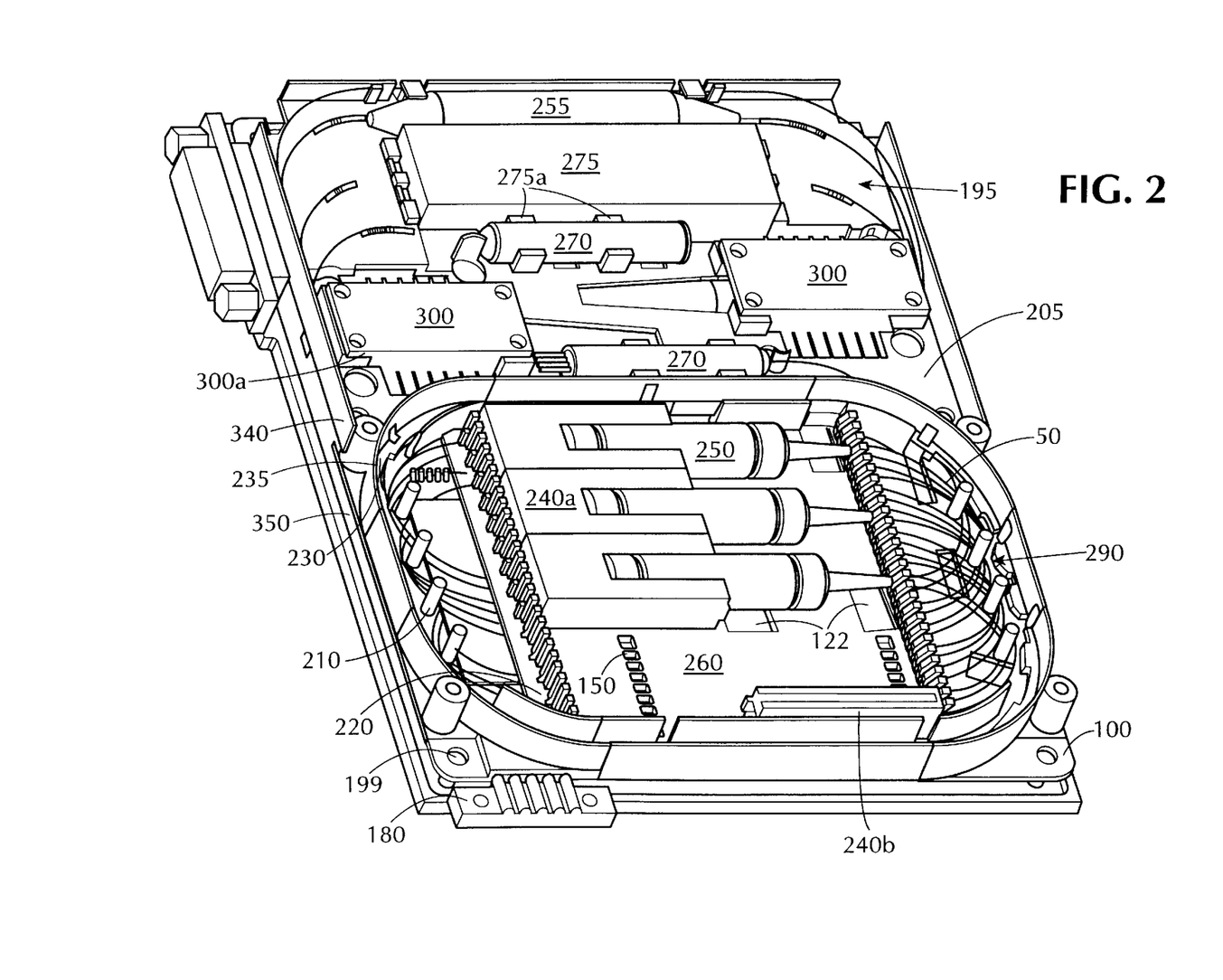
FIG. 2 is a perspective bottom view of the optical unit shown in FIG. 1.

Preferably the interface 180, as shown in FIG. 2, is formed with grooves so as to better hold the fibers entering and leaving the apparatus.

Once the fiber has reached the inside of the apparatus, it is laid on the frame 100 and affixed thereto by fitting it between some supports 175, then it is caused to run at the inside of a trough and maintained in place by tabs 135.

Then there are some areas where possible splices provided with their protection jackets are housed. In particular, the area 160 enables housing of splices both between two fiber lengths of same diameter and of different diameter, for example between a fiber with an external diameter of about 245–260 mm currently used at the inside of the apparatus and a fiber with an external diameter of about 900 mm currently used at the outside, because it is more resistant as it has an additional adhering protection (usually referred as "tight" fiber).

In this type of splicing a single jacket is provided which, due to the different sizes of the spliced fibers, has splicing portions with different external diameters. Thus the area 160 has one portion 160a in which the splicing portion with smaller diameter can be affixed, preferably by a fitting system involving some supports 161 between which the splicing portions of smaller diameter are inserted, and one portion 160b devoid of supports in which the splicing portions of greater diameter can be disposed, this portions occupying the support thickness.

Area 160 is preferably provided close to the interface 180, since this type of splicing is mainly carried out on the fiber lengths coming from the outside (that is provided with an adhering coating and having a diameter of about 900 mm).

Figure 6:
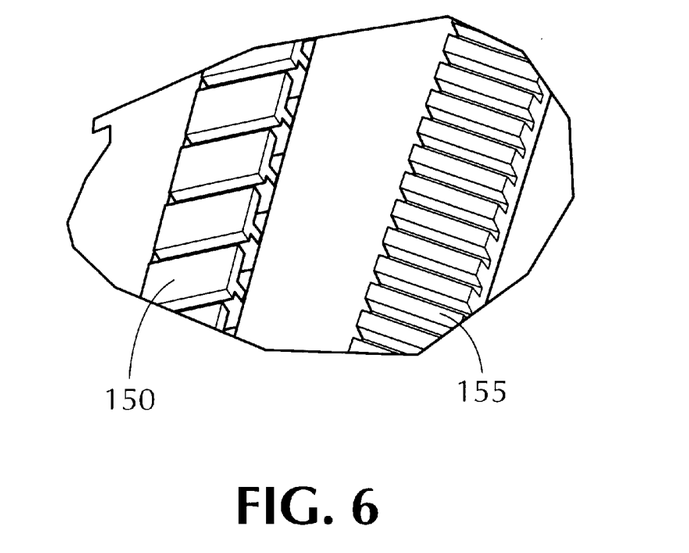
FIG. 6 shows a detail of the optical unit represented in FIG. 1 showing a pair of supports adapted to engage splices.

For splicings between fibers of the same diameter, of about 260 mm for example, a receiving area 140 is provided. Both the fiber length preceding splicing and the fiber length following it are housed in an aligned manner, preferably by a fitting system consisting of a pair of supports, one in the form of a "T" 150 and the other in the form of a tooth 155, as shown in FIG. 6, which supports cooperate in retaining the splices in the provided position within the area 140.

Preferably another area 170 is provided, in which other splices are housed.

The arrangement of areas 140, 160 and 170 enables the greatest ease in handling and the minimum mechanical effort on the optical fibers during the currently most delicate step in the assembling operations, that is when splicings are carried out by an appropriate machine (known in se and not described). To this end the container 110 is positioned alongside the splicing machine, and, once made, each splicing is moved to one of the receiving areas 140, 160, 170 that preferably are located close to the container 110 edge. Then, the pig-tails emerging from splices are easily introduced into the supports 150 and 155 by carrying out negligible bendings, so that each splice is fixed in alignment with the others and it is made accessible individually.

Area 190 further has a receiver 120 for collecting the surplus fiber which may be used for repeating splicings when imperfect, damaged or needing to be displaced, or for moving fiber lengths, from the apparatus to the splicing machine for example, in order to carry out splicing (for which operation usually at least 20 cm of fiber are necessary). The surplus fiber is maintained in place by holding tongues 122, essentially located in the receiver 120. In addition a holding band 124 is also present and it extends from one end to the other of the receiver 120, preferably fixed in the middle by a forced-fitting device 127, which band in cooperation with some of the tongues 122, forms loops 125. The loops 125 facilitate the fiber arrangement under the tongues and the band which are therefore retained in the receiver 120, thereby avoiding the surplus fiber from springing out of the receiver when the casing is opened, which will make operations on the optical unit less easy. In addition, by virtue of its size, the receiver 120 enables the winding direction of the fiber to be reversed without imposing small radii of curvature which are dangerous for the fiber; this is for example necessary when components having the fiber entry and exit physically disposed on the same side are used.

Typically, the frame is an almost monolithic element made of a plastic material by molding, mechanical machining or the like.

In addition, the area 190 has a plurality of openings which cannot be directly seen in the figures but are present close to portion 1 for example; they enable the fibers to pass to the other areas into which the frame 100 is divided.

Preferably some holes 199 are present and they enable passage of fastening means such as screws for connecting the frame 100 to the container 110.

The elements present in the area 195 will be described in the following with reference to FIG. 2 showing the frame 100 in a bottom view. In this case the container 110 has been removed, while both the electronic unit 350 and cover 340 of the optoelectronic apparatus are visible.

Two areas are present in the lower portion of frame 100, i.e. area 195 mainly containing the electro-optical components, also shown in FIG. 1, and an area 290 disposed close to the upper area 190 in which both active and passive optical components are mainly gathered.

Since both areas 190 and 290 are made in opposition with each other on the same portion of the frame 100 by means of molds, some raised elements present in area 190 can be also seen, in the form of cavities such as the teeth 150, in the area 290, and also tongues 122.

In particular there is a seating 230 preferably disposed along the peripheral portion of area 290, in which active fiber until an amount of 50 m can be preferably collected. This fiber is wound in the form of a toroidal coil, for example automatically over circular pulleys conveniently shaped for the purpose of facilitating extraction of the fiber torus without the same becoming disarranged. Preferably the fiber coil has its minimum circumference at least 1 mm greater than the minimum path in the appropriate seating 230 in which the coil is loosely disposed.

To keep the fiber coil more easily in place in the frame 100 an element 235 is used which by running over the seating 230 reduces the width of the latter thereby preventing the fiber from undesirably coming out.

Preferably a tray 260 of a substantially rectangular form is provided in the middle of area 290, being delimited over two opposite sides by two parallel portions of the seating 230 and over the remaining two sides by two elements disposed parallely which are substantially comb-shaped. Passive optical components 250 such as isolators, couplers, filters, are disposed in alignment within the tray 260.

The optical components are housed within cartridges 240, preferably of stiff plastic material such as nylon, having a standard external shape and bulkiness, adapted to be inserted by fitting into the tray 260 in an aligned relationship. Preferably for cartridges 240 three different, previously defined sections are adopted, of 4, 8 and 12 mm respectively, which values are multiples of a common value (4 mm) representing the periodicity enabling the tray 260 to dispose them in alignment. In this manner, for housing one component (250) having any size, a cartridge 240 is selected which has a pre-established section sufficient to hold it, then the inner seating of cartridge 240 is modified for housing it. Adapting the cartridge 240 to component 250 does not seem to be an expensive operation because when the component 250 section is changed, changing of the frame 100 mold for modifying the tray 260 is not required, the only change being that involving its insert 240.

Preferably the cartridge is a perforated element in the form of a parallelepiped, having an internal housing about 0.1–0.2 mm larger than the shape and size of component 250 and sufficient to enable fitting of component 250 on one side and exit of its pig-tail 50 on the opposite side. To reduce the overall bulkiness of cartridge 240 and facilitate the assembling operations of the two elements (cartridge and component) of different geometric form, the cartridge 240 is provided with an opening from which part of the component 250 can emerge. In addition, cartridges 240 can have a different assembling system depending on the type of component they have to house. Therefore, a first type of cartridge 240a is provided which is formed of two equivalent parts (only one of which is shown in FIG. 2) which are mounted on both ends of the components 250 of greater size, the optical isolators for example. Provided in a second type of cartridge 240b are instead two superposed housings adapted to house components 250 of reduced sizes, the directional or wavelength-selective couplers, for example.

Once mounting of component 250 in a cartridge 240 has been completed, the obtained element can be easily fastened to the inside of tray 260 by means of a fitting system with the aid of the comb-shaped element 220 which is preferably fixed to the frame 100 by a fitting system. The empty space of the comb 220 enables passage of the pig-tail So emerging from cartridge 240, while the hooked shape of the comb teeth by interacting with the projections present in the end portion of the cartridge 240, keep the latter in a locked position within the tray 260. Therefore, in order to maintain the pig-tails 50 extending between each comb 220 and the seating 230 in an orderly manner, said pig-tails are separated from each other by some cylindrical elements, four pins on each side for example, as shown in FIG. 2.

Figure 7:
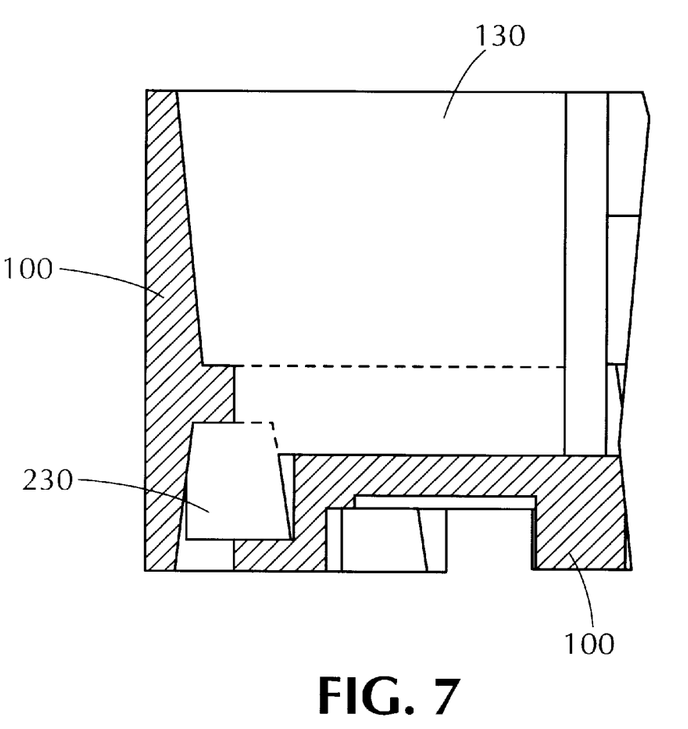
FIG. 7 is a detail of an opening for passage of the fibers from the upper to the lower part of the optical unit shown in FIGS. 1 and 2.

Provided in the seating 230 are openings, as shown in FIG. 7, which enable an easier passage of the fiber from the lower area 290 to the upper area 190 in the seating 130, for example close to portion 1 in FIG. 1. At these passage points an optical fiber laid on the bottom of seating 230 can pass to and lay on the bottom of seating 130 and vice versa, without inconvenient bendings being necessary, only a fiber translation for passing from one seating to the other being required.

Other openings, not shown in the figure, enable passage of the fibers from area 290 to area 195.

Disposed within the area 195 are the electro-optical components of the device. Shown for example in FIG. 2 are a pair of semiconductor lasers 300, a pair of photodiodes 270 and a tunable optical filter 275. A free area is also available for inserting possible components for which there is not sufficient room in the areas goexpressly arranged; for example, in FIG. 2 this area is occupied by an additional optical isolator 255. These components are preferably affixed to the frame by fitting systems, such as the shaped teeth 275a, formed close to the components to be locked to make assembling and disassembling of same easier, except for the semiconductor laser 300 that, having particular features, is fastened to the frame by an appropriate system to be described in more detail in the following with reference to FIG. 4. Thus all electrical contacts can be easily gathered in one portion 205 of area 195.

In a different embodiment of the present invention, possible electro-optical components that did not find sufficient room in the area 195, can be disposed in some of the previously described areas.

Figure 3:
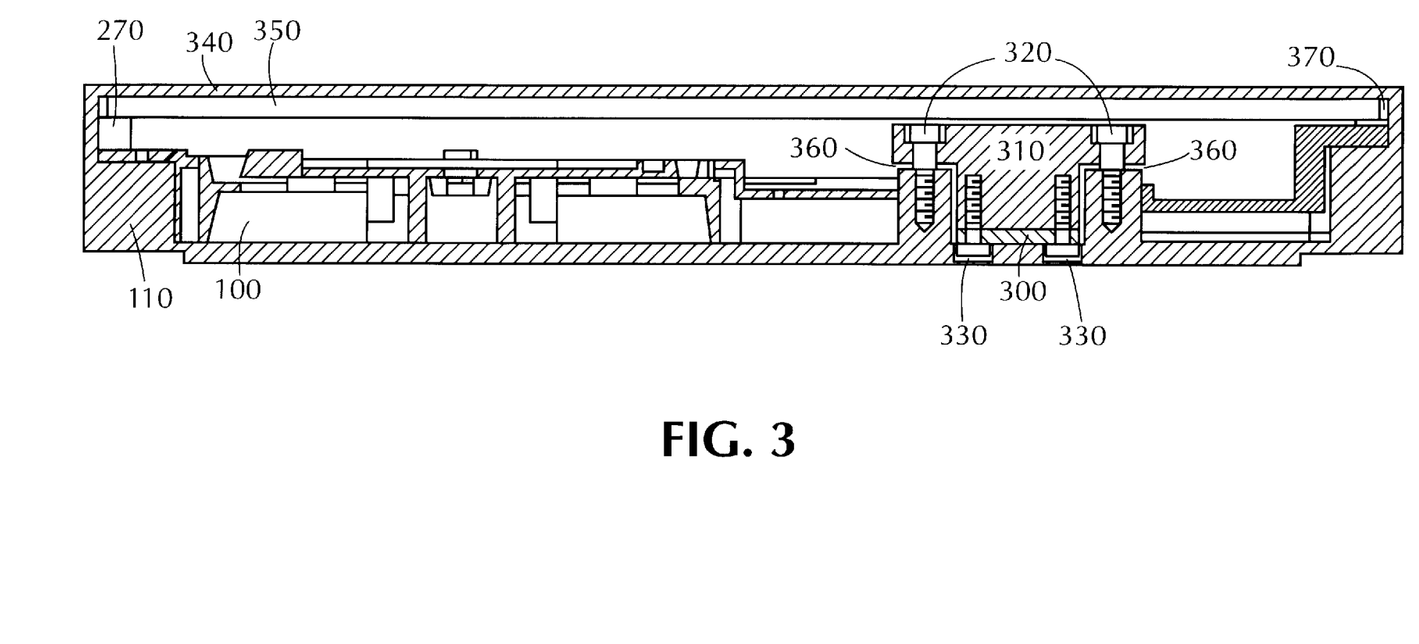
FIG. 3 shows an optoelectronic apparatus comprising the optical unit illustrated in FIG. 1, taken in section along line III—III in FIG. 1.

Shown in section in FIG. 3 is the whole apparatus comprising the optical unit already described with reference to FIGS. 1 and 2. The apparatus comprises the container 110 into which the frame 100, holding only some of the previously described components such as laser 300, is inserted. An electronic unit 350 is placed above the optical unit 100 but it is not in contact therewith, being preferably disposed externally of the container by means of a pair of spacers 370. The electronic unit 350 comprises elements adapted to enable feeding and control of the electro-optical components, such as the semiconductor lasers 300, photodiodes 270, tunable optical filter 275, in known manner. Alternatively, should feeding and control be carried out by equipments exterior to the apparatus, due to particular requirements, the electronic unit 350 can only comprise electric connections adapted to receive the different inputs and outputs of the electro-optical components on a multipolar conductor carried externally.

The connection means (not shown) between the optical 100 and electronic 350 units preferably is comprised of a conventional flat multipolar interface cable, long enough to enable connection to be maintained also when the electronic unit is temporarily removed, to enable inspection of the optical unit 100 for example, during the test steps. This cable therefore interconnects the electrical contacts gathered in the portion 205 of area 195 and the electronic unit 350.

The container 110 comprising the optical unit 100 is closed at the top by a cover 340, also comprising the electronic unit 350. Fastening of the whole assembly preferably occurs by conventional fastening means, screws for example that passing through the cover 350 and the two units 100 and 350 by means of holes present in the respective structures (only holes 199 are shown in FIGS. 1 and 2), are screwed down to a suitably arranged portion of the container 110.

Figure 4:
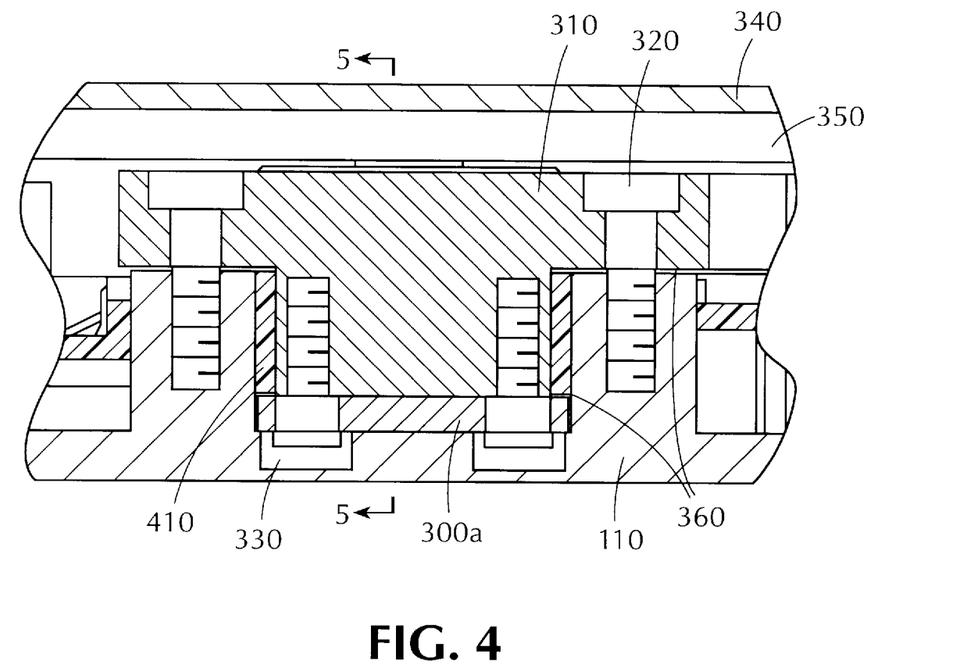
FIG. 4 shows a detail of the view shown in FIG. 3, relating to an electro-optical component.
Figure 5:
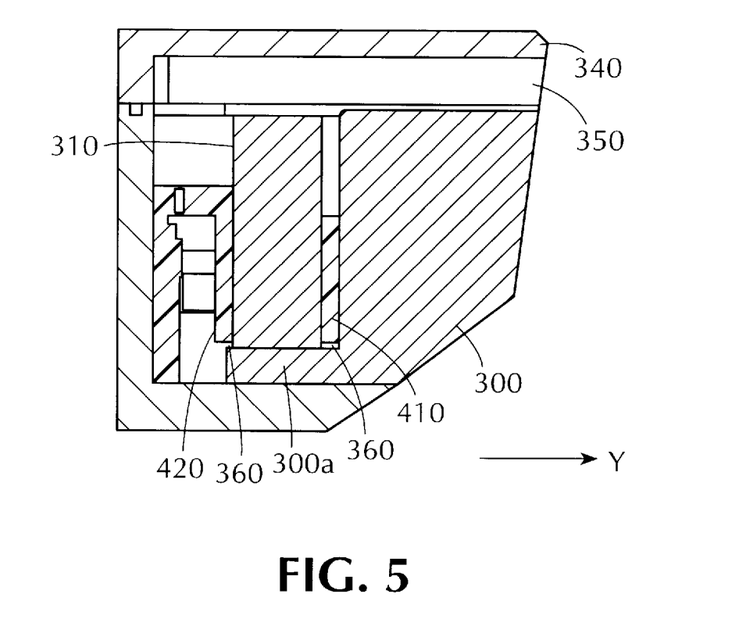
FIG. 5 shows the electro-optical component illustrated in FIG. 4, taken in section along line V—V in FIG. 4.

The method of fastening the semiconductor laser 300 to frame 100 will be now described, with reference to FIGS. 4 and 5. However this method is also adapted for fastening different electro-optical components in an optoelectronic apparatus, which components, due to heat generated during operation of same, need to be thermally connected to the external container of the apparatus itself, in order to improve their heat dissipation.

First, laser 300 connected by a connection fiber to one or more components integral with said optical unit, is inserted in the appropriate housing arranged on the frame 100. Disposed close to this housing is a pair of guides 410 and 420, preferably formed on the frame 100 during the molding step, which enable the laser to freely slide in a direction parallel to the direction Y shown in FIG. 4. Fitted in this pair of guides are two substantially T-shaped metal supports 310, of aluminum for example, which can freely slide in the same direction Y as the laser. The supports are then secured by first fastening means, screws 330 for example, to laser 300. In particular, screws 330 link the support 310 leg with a flange 300a of laser 300. Consequently, cooperation between the laser 300 flanges on the one hand and the support 310 arms on the other hand for incorporating the guide 410, of lesser length than the support leg, enables the laser-support (300–310) system to be linked with the frame 100 with clearance 360, preventing the laser-support system from coming out of its seating in the frame 100 and from stressing the connection fiber in a dangerous manner. Preferably clearance 360 is included between 0.2 mm and 0.4 mm. This first fastening system enables all tests on the optical unit to be carried out without being it necessary to complete the apparatus assembling and inhibiting the laser not yet conveniently affixed from coming out of its seating during this step, when the frame 100 is overturned for example.

Then the optical unit is inserted into the container 110 to which the laser-support system (300–310) is fixedly mlinked, being in contact therewith, by second fastening means, screws 320 for example. In this case the clearance 360 present between the support 310 arms and the container 110 is reduced by pressure transmitted by the screws 320 to the arms that consequently will transmit to the central portion of the support 310 a force adapted to press the laser against the inner surface of the container 110, thereby improving the thermal contact thereof. Preferably, to improve thermal dissipation to the outside and make the apparatus stronger, the container 110 is made of metal, aluminum for example.

In accordance with the above description, the step of accomplishing the optoelectronic apparatus is particularly easy. In fact the optical unit is completed by disposing on the frame 100 all the necessary optical components, inclusive of lasers 300 exclusively fastened by means of screws 330. Parallely the electronic unit is assembled in a conventional manner not described. Once both the units have been made, they can be tested independently of each other. Then the optical unit is inserted in the container 110 and lasers 300 are definitively secured to the frame 100 and container 110 by screws 320. At this point the electronic unit is connected and superposed with the optical unit and the assembly is tested again. Should problems arise, the electronic unit 350 can be merely shifted to enable access to the optical unit without being obliged to remove the connection, and the test can be carried out in this condition too. Once the test has been completed, the apparatus is closed by cover 340 and other screws carry out a the final fastening.

I claim:

1. A method of assembling an optoelectronic apparatus comprising a casing (110) having closure means (340), an optical unit (100) having a plurality of areas (190, 195, 290) and an electronic unit (350), characterized in that it comprises the following steps:

disposing at least an optical connection component on said optical unit (100) in one of said areas and optionally, a component belonging to one of the following groups: of an optical type (50, 250), of an electro-optical type (270, 275, 300) in others of said areas, each of said plurality of areas having components substantially of a single type mounted thereon;

inserting said optical unit (100) into said casing (110), one portion of said optical unit (100) being directly accessible from the outside and comprises at lease one area (190) of said plurality of areas, said optical connection components being disposed on said at least one area (190);

electrically connection said electronic unit (350) to said optical unit (100);

securing said electronic unit (350) to said optical unit (100);

closing said casing (110) by said closure means (340) so as to removably hold said units in said casing.

2. An optoelectronic apparatus comprising a casing (340, 110) within which an electronic united (350) and an optical unit electrically interconnected are disposed, said optical unit comprising a mounting element (100) on which components of an optical type (50, 250) and optical connection are mounted characterized in that said element (100) comprises a plurality of separate area (190, 195, 290), each of said plurality of areas having components substantially of a single type mounted thereon and said element (100) comprises a first face and an oppositely facing a second face, the area (190) for optical-connection components being located on said first face, the area (290) for components of the optical type (50, 250) being located on said second face, the area for the optical connection components having substantially the same size as the area for the optical type components and being aligned with the area for the optical type components in the direction from said first surface to said second surface.

3. An apparatus according to claim 2, wherein there is an area (195) for components of the electro-optical type (270, 275, 300)which is adjacent to said area (290) for components of the optical type (50, 250) and said area (190) for optical-connection components.

4. An apparatus according to claim 3, wherein said at least one component of the electro-optical type passes through said element (100).

5. An apparatus according to claim 4, wherein said area (195) for optical-connection components is directly accessible from the exterior, once said electronic unit (350) has been removed.

6. An apparatus according to claim 5, wherein said area (190) for optical-connection components comprises a receiver (120) for collecting surplus optical-fiber lengths and an area (140, 160, 170) for housing splices interconnecting optical fiber lengths.

7. An apparatus according to claim 6, wherein said receiver (120) comprises means (122, 124) for retaining said surplus fiber lengths in said receiver.

8. An apparatus according to claim 6, wherein said area (140, 160, 170) for housing splices is disposed close to the casing (110, 340) edges.

9. An optoelectronic apparatus comprising a casing (340, 110) within which an electronic unit (350) and an optical unit electrically interconnected are disposed, said optical unit comprising a substantially monolithic element (100) housing at least one component, said component belonging to one of the following groups:

of an optical type (50, 250), of optical connection, of an electro-optical type (270, 275, 300), characterized in that said element (100) comprises a plurality of separate areas (190, 195, 290), each of said plurality of areas housing components substantially of a single type and comprises a first face in opposition to a second face, the area (190) for optical-connection components being placed on said first face and the area (290) for components of the optical type (50, 250) being placed on said second face, each area substantially having the same size as, and being in opposition to the other area and wherein the area (195) for components of the electro-optical type (270, 275, 300) is adjacent to said area (290) for components of the optical type (50, 250) and said area (190) for optical-connection components and wherein said at least one component of the electro-optical type passes through said element (100).

\* \* \* \* \*